United States Patent Office 3,191,363
Patented June 29, 1965

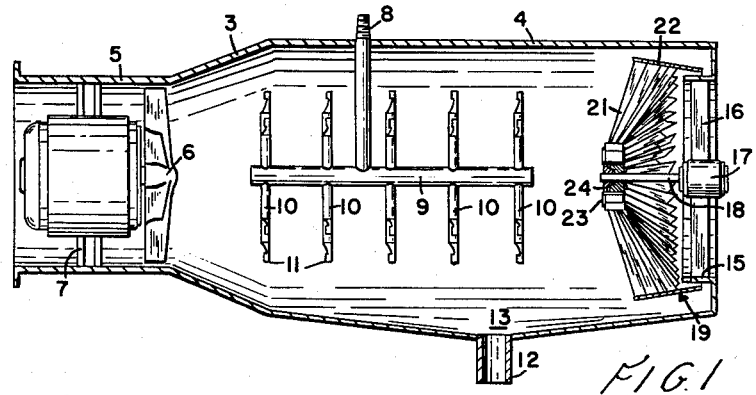
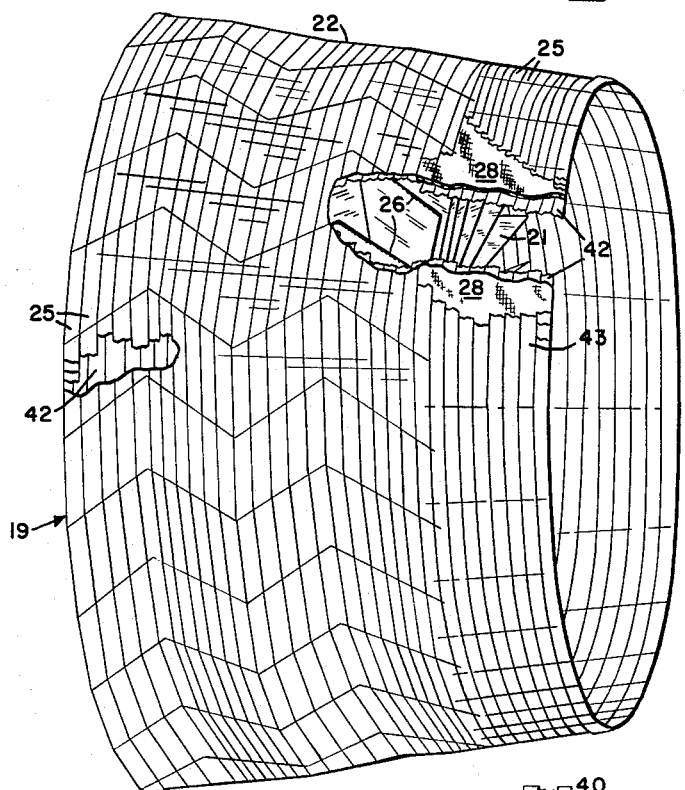
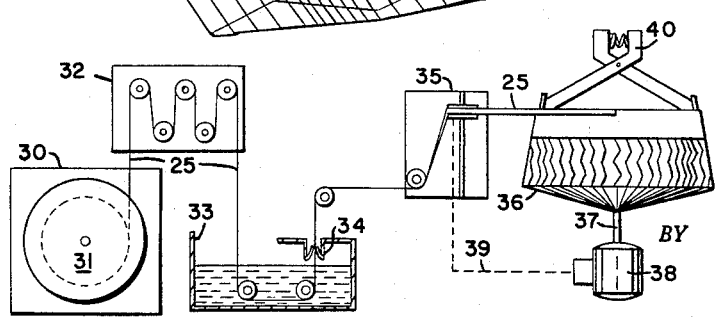
FIG. 1
FIG. 2
FIG. 3
INVENTORS.
WILLIAM C. MARTIN JR.
HARRIS S. RUSH
BY Seymour Rothstein
ATTORNEY.

---

3,191,363
APPARATUS FOR TREATING AIR
William C. Martin, Jr., Syracuse, and Harris S. Rush, Clay, N.Y., assignors to Carrier Corporation, Syracuse, N.Y., a corporation of Delaware
Filed Apr. 7, 1961, Ser. No. 101,579
6 Claims. (Cl. 55—257)

This invention relates to an apparatus for treating air and, more particularly, to an apparatus for treating air of the type generally used in air conditioning and air washing systems, wherein a rotating eliminator removes water particles from an air stream. This invention also relates to a novel eliminator structure.

In the Ernest C. Hungate Patent No. 2,932,360, entitled "Apparatus for Treating Air," there is disclosed an apparatus for treating air which wholly departs from previous concepts of apparatus of this type. In the above-mentioned patent, the apparatus includes a casing having means for passing an air stream therethrough. Means are provided for placing the stream in direct contact with water, such means usually comprising a plurality of spray members capable of discharging finely divided particles of water into the air stream. A bladed rotor which functions as an eliminator is placed within the casing, usually adjacent the outlet, to remove entrained water particles from the discharge air stream. This eliminator may include a plurality of radially extending blades which have an annular enclosing means placed about the periphery of the bladed structure. These blades preferably are oriented in such a manner that the axial projections of the blades overlap.

The chief object of the present invention is to provide an improved apparatus for treating air.

A further object is to provide an improved eliminator structure for use in an apparatus for treating air.

Another object of the invention is to provide an improved and inexpensive bladed rotor construction.

Other objects of the invention will be readily perceived from the following description.

This invention relates to an apparatus for treating air which comprises a casing, means for passing an air stream through the casing, means for placing the air stream in contact with a spray of water, a bladed eliminator for removing entrained water particles from the air stream, and means for rotatably mounting the eliminator, the eliminator having a shroud at least partially enclosing the periphery of the blades, the shroud being formed from a line wound about the blades, the adjacent turns of the line engaging one another, the line being connected to each blade at the extremity thereof.

This invention also relates to a bladed rotor comprising a rotatable hub, a plurality of blades secured to the hub and a shroud at least partially enclosing the periphery of the blades, the shroud being formed from a substantially continuous line treated with a self-extinguishing thermo-setting resin.

The attached drawing illustrates a preferred embodiment of the invention in which:

FIGURE 1 is a sectional view of the apparatus of the present invention;

FIGURE 2 is a perspective view of the eliminator of the apparatus of FIGURE 1.

FIGURE 3 is a schematic diagram illustrating a method of fabricating the eliminator of the present invention.

Referring to the drawing, there is shown in FIGURE 1 an apparatus for treating air embodying the present invention. The apparatus includes a casing 3 which consists of a main section 4 and an inlet section 5 which is of a smaller diameter than the main section 4. Fan 6 is located in the inlet section and is mounted therein by means of suitable struts 7.

A water supply line 8 extends through the main section 4 and is connected to the supply header 9 which extends longitudinally within the main section 4. A plurality of banks of lines 10 extend from the supply head 9. Suitable nozzles 11 are located at the extremities of the individual lines 10. Drain 12 is located in the bottom portion of the main section 4 to remove water from the sump 13 of the unit.

At the end of the main section 4 is located an exit portion 15, wherein is mounted a suitable bearing 17. This bearing 17 is mounted by means of suitable struts 16. A shaft 18 is journalled within the bearing 17. Mounted on the shaft 18 is the bladed rotor 19, which is the eliminating device of the present apparatus.

This eliminator comprises a plurality of radially extending blades 21 which are attached to a novel frusto-conical shaped enclosing means or shroud 22. These blades cooperate with the surfaces of adjacent blades to define a plurality of zigzag passages through the bladed structure in a manner more fully described in the previously mentioned patent of Ernest C. Hungate.

Considering the operation of the apparatus, in FIGURE 1 air is induced through the casing 3 by means of the fan 6. As the air stream passes through the casing, water is passed into the line 8 through the spray header 9 and is discharged through the nozzles 11 thereby filling the main section 4 of the casing with a fine water spray. The humidity of the air and also the temperature of the air passing through the unit is affected by this relation with the water spray. As the air passes through the exit portion of the casing, it will tend to carry undesirable entrained water particles.

To remove these entrained water particles from the air stream, the eliminator structure 19 is provided. The bladed structure rotates and intercepts the water particles as it passes through the zigzag passages in the bladed structure and returns the water into the casing to be discharged through the drain 12. The operation of the apparatus in FIGURE 1 is fully described in the previously described patent of Ernest C. Hungate.

The blade members 21 comprise a plurality of surfaces which are angularly disposed with respect to one another. The blades are rigidly affixed to hub 23, which is secured to shaft 18 by suitable hub-mounting means 24, which may be of conventional design. A preferred manner of connecting the blades to the hub is described in Richmond S. Hayes, Jr., Patent No. 3,073,096, issued January 15, 1963.

In essence, the shroud 22 (FIGURE 2) is formed from one or more layers of line 25 wound onto the blade structure and suitably bonded thereto. The resultant eliminator has superior strength and the manufacturing cost thereof is substantially less than the cost of previous eliminators of this type.

In constructing the eliminator, first an eliminator subassembly 36 is fabricated. The blades are shaped as illustrated in the aforementioned Hungate patent. The outer edge of each blade 21 is smoothed along both the length and width thereof to prevent tearing or fracturing of the line in subsequent fabrication. The edge of each blade 21 may be mechanically rounded as by grinding. However a more satisfactory and expeditious method of effecting the same result is to dip the end of each blade into a thermo-setting resin to form a bead 26 thereon. Another manner of rounding the outer edge of each blade which would be apparent to those versed in the art would be to apply a molded blade tip cap. The blade members are secured to hub 23 to form the eliminator subassembly 36. This eliminator subassembly is mounted on shaft 37 (see FIGURE 3).

The collapsible support member 40, which defines a surface conforming to the inner configuration of the shroud is positioned adjacent the eliminator subassembly. The surface of the member 40 may be covered with a layer of material, as for example, tetrafluoroethylene, to prevent adherence of the resin-impregnated line. The collapsible support member may be manually actuated or may be power actuated.

At the supply station 30 there is mounted a drum or spool 31 upon which is wound line 25. The line is preferably formed from glass fibers or filaments. Fibers or filaments made of nylon of polyester materials, for example "Dacron" may be used, as will be apparent to those persons skilled in the art. The glass fiber line or roving 25 extends through a tensioning mechanism 32 into the tank 33 containing the catalyzed thermosetting resin. A suitable resin is "Hetron 31" manufactured by Durez Plastics Division of Hooker Chemical Corporation.

As the line or tape leaves the tank 33, the excess resin is wiped off at station 34 and returned to the tank. The line extends through the feed mechanism 35 and is secured at one end of the eliminator subassembly mounted on the shaft 37. Shaft 37 is rotated by a suitable drive mechanism 38 which may include an electric motor and gear reduction mechanism.

The feed mechanism is operatively connected to the drive mechanism by suitable linkage 39.

An end of the line is secured to the eliminator subassembly 36 to wind the line onto the periphery of the eliminator structure, and the drive mechanism is actuated to rotate shaft 37. The rotation of the eliminator structure will draw the line from the spool 31 through the resin tank 33 wherein the line will be impregnated with the resin. At wipe-off station 34, the excess resin will be removed. Feed mechanism 35 will regulate the winding of the line onto the periphery of the blades. The line may be wound so that adjacent turns contact one another at each side. An alternative method of winding the line onto the periphery of the blades and the support member 40 is to cause adjacent turns of the line to overlap one another. In this manner the first layer 42 of the shroud 22 is formed.

A backing material 28 made from woven fabric or roving is positioned over a portion of the blades and over the line on the support member 40 to provide longitudinal support for the portion of the compelted shroud overhanging the blades.

A second layer 43 of resin-impregnated line is wound over the first layer 42 and covers the backing material. For added strength, additional layers of line may be wound on each end of the shroud as clearly seen in FIGURE 2.

When the resin sets, the collapsible support member is removed. The resultant eliminator is provided with a strong and rigid shroud.

This method of fabricating an eliminator or bladed rotor is simple and relatively inexpensive.

The connection between the blades and the shroud is in essence a bead which is smooth and obviates the adherence thereto of lint or other materials removed from the air stream by the eliminator structure.

We have, therefore, provided an improved eliminator structure for use in an apparatus for treating air.

The present invention has been illustrated with particular reference to air treating apparatus. However, it is apparent that this type of structure may be used in other environments wherein it is desired to join blade members to a shroud in an inexpensive and simple structure.

While we have described a presently preferred embodiment of our invention, it will be understood that the invention is not limited thereto since it may be otherwise embodied within the scope of the claims.

We claim:
1. In an eliminator for removing droplets of water from an air stream, a rotatably mounted hub, a plurality of blades extending radially therefrom, each of said blades having a resinous material covering the outer peripheral edge thereof and at least a first planar portion and a second planar portion, said portions being angularly disposed with respect to each other and intersecting with a line drawn radially from said hub, said blades defining a plurality of axial paths each having at least one change in direction and means for at least partially enclosing the periphery of said blades, said means comprising at least one layer formed from a substantially continuous line dipped in a resinous material wound successively over said blade periperal edges to form a substantially uninterrupted surface, fabric means around a part of said one layer, said fabric means extending in an axial direction beyond one edge of said one layer, and at least one additional layer formed from a substantially continuous line dipped in a resinous material wound successively over said fabric means and said one layer.

2. In an apparatus for treating air, the combination of a casing, means for passing an air stream through the casing, means for placing the air stream in contact with a spray of water, a bladed eliminator for removing entrained water particles from the air stream, and means for rotatably mounting said eliminator, said eliminator having a shroud at least partially enclosing the periphery of the blades, said shroud being formed from a substantially continuous line treated with a thermosetting liquid resin wound successively over the outer peripheral edges of said blades to form a substantially uninterrupted surface, said resin bridging between the sides of said blades and said line, said resin when cured preventing movement between said line and said blades.

3. A bladed rotor comprising a rotatable hub, a plurality of blades secured to said hub, each of said blades having a thermosetting resin covering at the periphery thereof, and a shroud at least partially enclosing said blade periphery, said shroud being formed from a substantially continuous line treated with a self-extinguishing thermosetting resin wound successively upon said blade periphery to form a substantially uninterrupted surface, said resin bridging between said blade covering and said line, said line treating resin when cured preventing relative movement between said line and said blades.

4. A bladed rotor as in claim 3 wherein the line is formed from glass filaments coated with said resin.

5. A bladed rotor comprising a rotatable hub, a plurality of blades secured to said hub and a shroud at least partially enclosing the periphery of the blades, said shroud comprising a first layer formed from a substantially continuous line treated with a thermosetting resin wound successively over the outer peripheral edge of said blades to form a substantially uninterrupted surface, said resin bridging between the outer edges of said blades and said line, said resin when cured preventing relative movement between said line and said blades, a backing material over a portion of said first layer including one end thereof, a part of said backing material extending axially beyond said first layer one end, and at least one layer formed from said substantially continuous line wound successively over said backing material and the remaining part of said first layer.

6. A bladed rotor as in claim 5 in which each of said plural blades comprise a rigid blade-like member having a thermosetting resin covering at the outer edge thereof.

References Cited by the Examiner
UNITED STATES PATENTS

| | | | |
|---|---|---|---|
| 2,579,583 | 12/51 | Johnson | 29—156.8 |
| 2,825,124 | 3/58 | Nichols et al. | 29—156.8 |
| 2,932,360 | 4/60 | Hungate | 55—257 |
| 2,962,116 | 11/60 | Hayes. | |
| 3,023,135 | 2/62 | Wiltshire | 156—189 |

HARRY B. THORNTON, *Primary Examiner.*